(12) United States Patent
Rowley

(10) Patent No.: US 6,902,210 B1
(45) Date of Patent: Jun. 7, 2005

(54) UNIVERSAL CONNECTOR TUBING

(76) Inventor: William W. Rowley, 35 Wilding Chase, Chagrin Falls, OH (US) 44022

( * ) Notice: Subject to any disclaimer, the term of this patent is extended or adjusted under 35 U.S.C. 154(b) by 0 days.

(21) Appl. No.: 10/065,594

(22) Filed: Nov. 1, 2002

(51) Int. Cl.[7] .............................................. F16L 25/00
(52) U.S. Cl. .................. 285/386; 285/354; 285/334.2; 285/343
(58) Field of Search ............................... 285/386, 354, 285/334.2, 341, 343, 353, 384, 387, 388, 285/256

(56) References Cited

U.S. PATENT DOCUMENTS

| | | | | |
|---|---|---|---|---|
| 538,634 A | * | 4/1895 | Witham ................... | 285/334.2 |
| 2,344,698 A | * | 3/1944 | Howe .......................... | 285/341 |
| 3,140,106 A | * | 7/1964 | Thomas et al. ............. | 285/256 |
| 3,486,771 A | * | 12/1969 | Conlin ........................ | 285/341 |
| 3,572,775 A | * | 3/1971 | Bloom et al. ................ | 285/386 |
| 3,831,983 A | * | 8/1974 | Stickler ....................... | 285/386 |
| 4,665,876 A | * | 5/1987 | Hashimoto ................... | 285/386 |
| 5,375,887 A | * | 12/1994 | Johnson ....................... | 285/341 |
| 5,607,191 A | * | 3/1997 | Wilson ........................ | 285/256 |
| 5,833,279 A | * | 11/1998 | Rowley ....................... | 285/354 |
| 6,290,265 B1 | | 9/2001 | Warburton-Pitt et al. ... | 285/131 |
| 6,322,551 B1 | | 11/2001 | Brugger ....................... | 604/533 |
| D453,817 S | | 2/2002 | Patteson et al. ........... | D23/262 |

* cited by examiner

Primary Examiner—David E. Bochna
(74) Attorney, Agent, or Firm—Buckingham, Doolittle & Burroughs, LLP; Louis F. Wagner

(57) ABSTRACT

The invention is a universal connector which is useful with a variety of differently configured and shaped fittings as well as for applications when the fittings are identical. The connectors provided at either end of the tube may be formed by either compression molding or injection overmolding whereas the connections which are provided internal of either end connection, are positioned on the tube by injection overmolding.

56 Claims, 7 Drawing Sheets

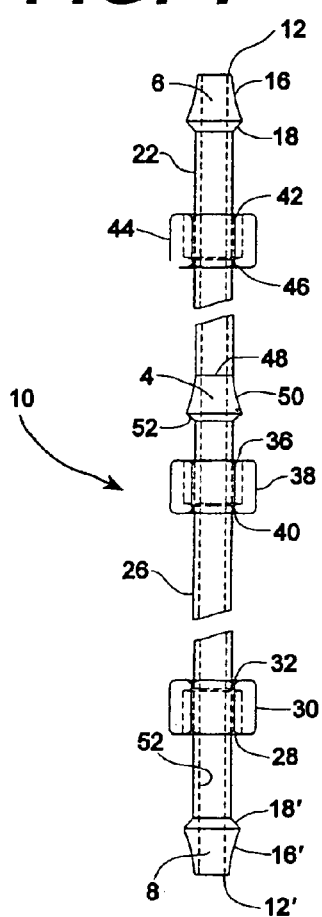
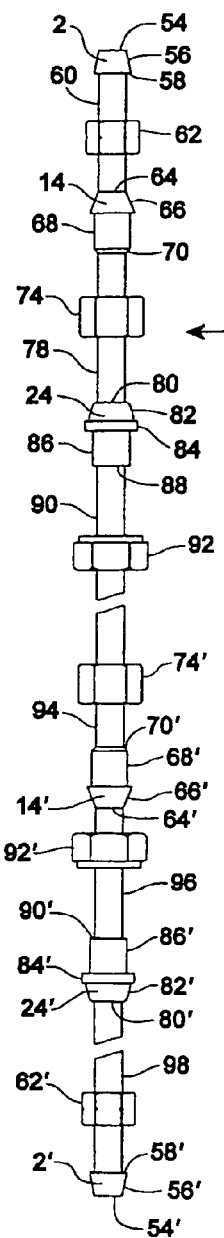
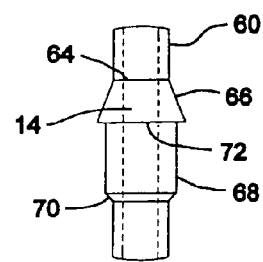
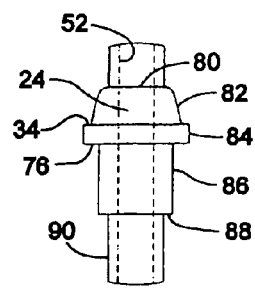
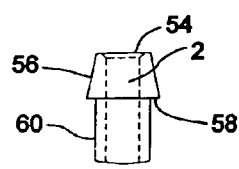

FIG. 9
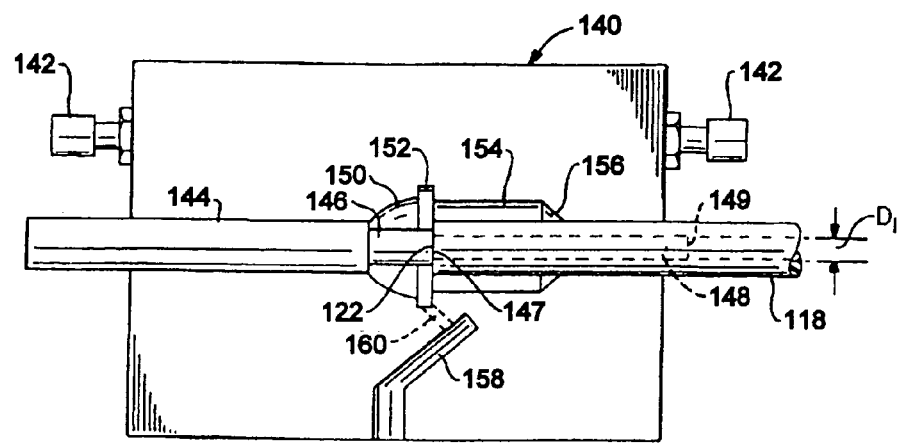
FIG. 10
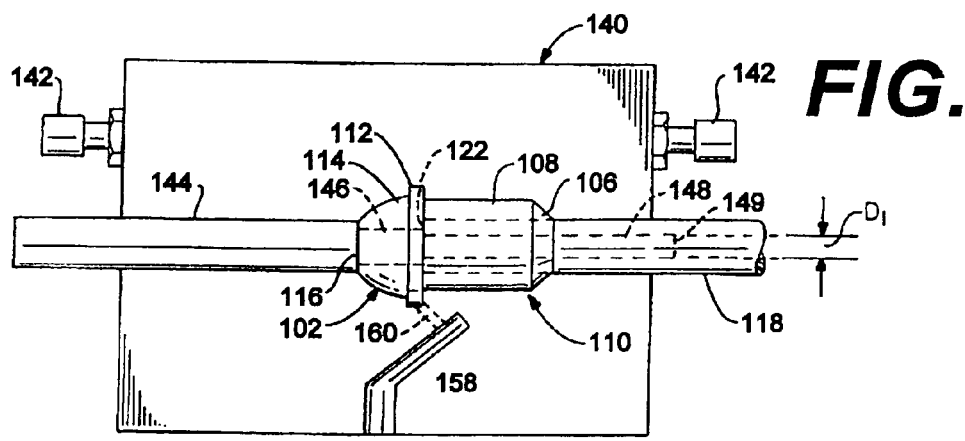
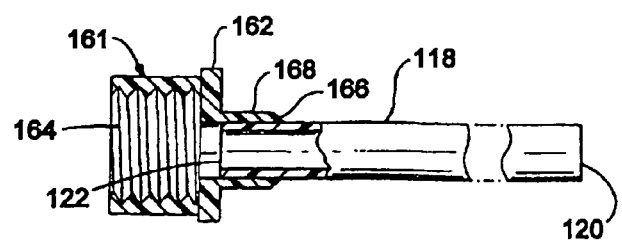
FIG. 11

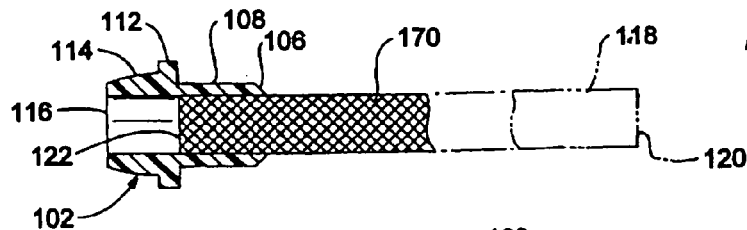
FIG. 12
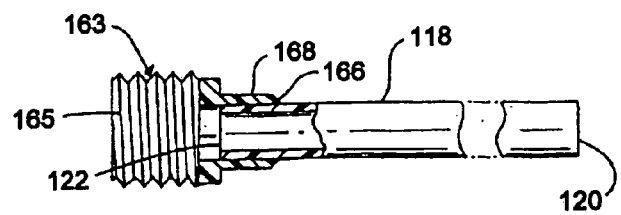
FIG. 13
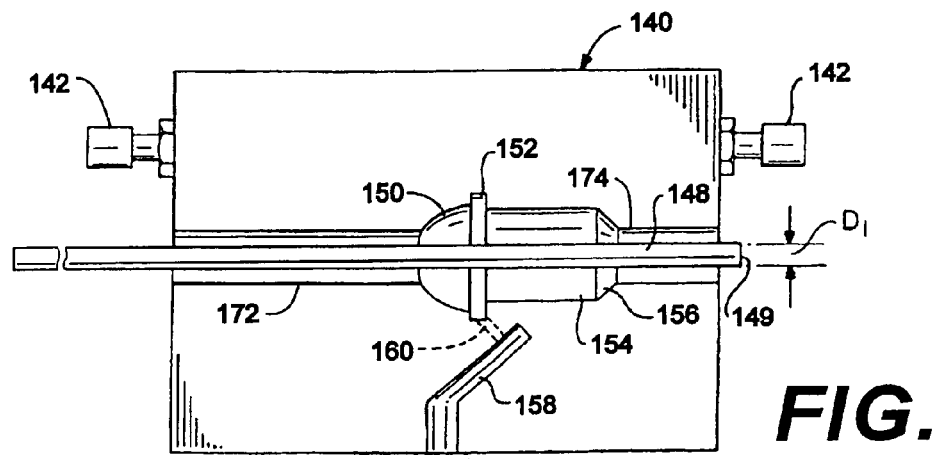
FIG. 14
FIG. 15
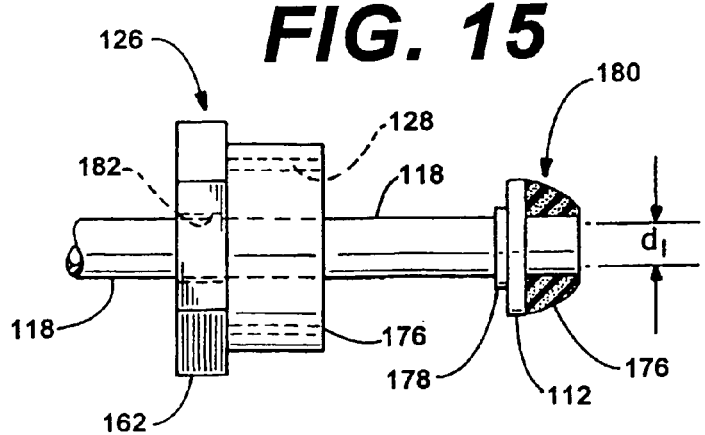
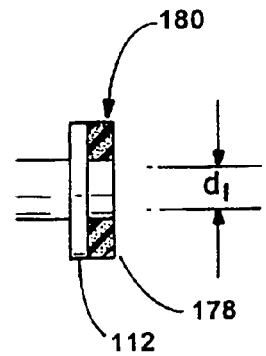
FIG. 16

UNIVERSAL CONNECTOR TUBING

BACKGROUND OF INVENTION

The invention relates generally to a universal connector which is useful with a variety of differently configured and shaped fittings as well as for applications when the fittings are identical. The connections provided at either end of the tube may be formed by either compression molding or injection overmolding whereas the connections which are provided internal of either end connection, are positioned on the tube by injection overmolding.

In any environment, the need exists to be able to connect fluid conduits and pipes of different diameters as well as tubing and pipe fittings having different configurations and geometries. While this is not a problem for an experienced plumber with a working knowledge of standardized pipe and tubing sizes and fittings, the challenge is more difficult for the homeowner or the do-it-yourselfer. This individual is often presented with a seemingly infinite variety of options at a hardware store or other location which sells plumbing supplies. This has often resulted in either numerous trips to the store or in the purchase of many unnecessary component pieces with the expectation that some combination of the purchased hardware will be capable of interconnecting the target with the source.

What has heretofore been missing from the Prior Art is a universal connector which can be either cut to length, thereby being capable of being reduced in length from an original length to a shorter length at the installation location thereby minimizing the need for initial accurate measurements, or which can be cut to expose various combinations of connectors and appropriate fittings so as to be capable of interfacing between a ⅜" I.D. source fitting with a ¼" I.D. target fitting at the installation location.

SUMMARY OF INVENTION

The invention is directed to the use of a universal connector having multiple encapsulated connectors and fitting hardware therein to enable a user to interconnect a fluid source fitting with a target fitting. In order to be applicable to a wide variety of geometries of fittings, the connector will usually have a plurality of entrapped connector geometries and associated hardware, e.g., nuts, O-rings, etc., so that upon a user cutting the connector so as to expose an appropriately sized connector, the exposed connector will provide an essentially leak-proof connection upon fastening. The entrapped connectors are affixed to the tube by injection overmolding with the appropriately configured hardware inserted prior to the step of overmolding.

In one principal aspect of the present invention, the universal connector is designed so as to permit connection between a fluid source fitting having one geometry with a target recipient fitting having a second geometry.

In another principal aspect of the present invention, the invention enables one tube to serve as a universal conduit for mating fittings of different or the same geometry by cutting the conduit to expose appropriately configured connectors.

Accordingly, it is an object of the present invention to overmold at least one, often two or more, connectors so that one universal connector can be used to effect fluid leak-proof connection between a fluid source fitting and a target recipient fitting.

It is another object of the present invention to provide a plurality of entrapped connectors of different geometries, so that a user can effect connection between two fittings of either the same or different geometries using one initial length of a universal connector by appropriately cutting the connector to expose the connector geometry of choice.

These and other objects of the present invention will become more readily apparent from a reading of the following detailed description taken in conjunction with the accompanying drawings wherein like reference numerals indicate similar parts, and with further reference to the appended claims.

BRIEF DESCRIPTION OF DRAWINGS

The invention may take physical form in certain parts and arrangement or parts, a preferred embodiment of which will be described in detail in the specification and illustrated in the accompanying drawings which form a part hereof, and wherein:

FIG. 1 is a side elevational view of a universal connector with one entrapped connector fitting showing the internal diameter of the fittings and tube in ghost lines;

FIG. 2 is a side elevational view of a universal connector with four entrapped connector fittings;

FIG. 2A is an enlarged elevational view of an alternative embodiment of an end fitting of either FIG. 1 or 2 which uses a ferrule as the sealing surface;

FIG. 3 is an enlarged side elevational view of a first entrapped fitting of FIG. 2;

FIG. 4 is an enlarged elevational view of a second entrapped fitting of FIG. 2;

FIG. 5 is an enlarged elevational view showing one of the two end fittings of FIG. 2;

FIG. 9 is a view similar to FIG. 8 showing the plastic tube inserted over the mandrel in the mold;

FIG. 10 is a view similar to FIG. 9 with the nose cone shown overmolded onto the plastic tube;

FIG. 11 is a side view shown in partial cross-section of an alternative embodiment of the connector showing an overmolded nut usable as an end of the connector;

FIG. 12 is a view similar to FIG. 6 showing the nose cone in cross-section and the tube having an overbraid;

FIG. 13 is a side view shown in partial cross-section of an alternative embodiment of the connector showing an overmolded threaded connector usable as an end of the connector;

FIG. 14 is a top view of one half of a mold used in the process of overmolding a fitting onto a non-end segment of a plastic tube;

FIG. 15 is an elevational view of an alternative embodiment of the connector showing a male segment with an integrally molded shelf with a separate nosecone sealing surface shown in cross-section;

FIG. 16 is an elevational view of an alternative embodiment of FIG. 15 showing a different separate nosecone sealing surface shown in cross-section;

DETAILED DESCRIPTION

Figure 6:
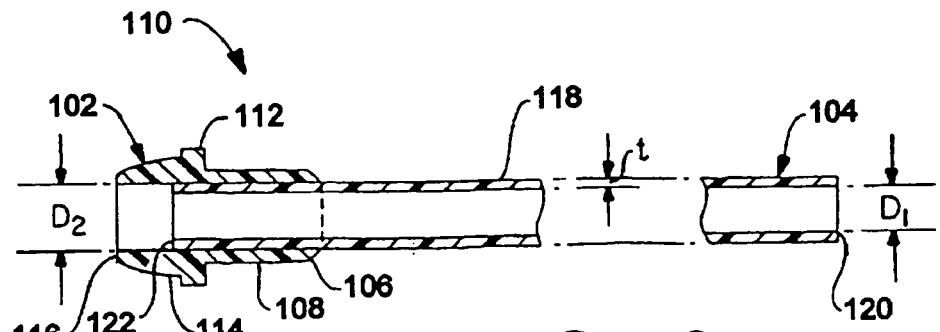
FIG. 6 is an enlarged cross-section view of one end of an alternate embodiment of a universal connector plastic tube showing one end connector overmolded thereto.

Referring now to the drawings wherein the showings are for purposes of illustrating the preferred embodiment of the invention only and not for purposes of limiting the same, the Figures show universal connectors with a multiplicity of optional fittings and connections associated therewith, entrapped within the extremities of the connector, as well as at each tubing end.

As shown in FIG. 1, the universal connector 10 is an elongated hollow tube (typically an extruded tube) which has a first end 12 and an opposed and oppositely facing second end 12'. At each end is a first 6 and a second 8 oppositely facing connector, each connector having a terminal end 12,12', a geometrically radially expanding sealing surface 16,16' and a beveled collar 18,18'. At a location between the first connector 6 and the second connector 8, is at least one, often more, overmolded entrapped connector bodies 4 for which only one connector body is shown in FIG. 1, the shown connector having an end 48, a radially expanding sealing surface 50 and a beveled collar 52. Interposed between the first terminal end 12 and end 48 of the entrapped connector 4 within tubing segment 26 is a nut 44 having a centrally disposed aperture therein dimensioned for sliding movement about the exterior diameter of tube segment 22. Nut 44 has an outwardly and end facing hollowed out bore 42 dimensioned for penetration over beveled collar 18 and positioning in abutting contact of cylindrical ledge 46 with collar 18. Leak-proof engagement is effected through rotational threaded communication with a mating fitting (not shown), which effects longitudinal axial movement by peripheral axial rotational movement of nut 44 with sealing contact effected by contacting engagement of a portion of sealing surface 16 on a circumference of an apertured opening in the fitting. Positioned between second connector 8 and third connector 4 on tubing segment 26 are a pair of oppositely facing threaded nuts 30, 38. Leak-proof engagement of the second connector 8 with an aperture in a fitting (not shown) is effected in the same manner as described previously with nut 44 and first connector 6 involving contacting engagement of sealing surface 16' with a circumference of an apertured opening in the fitting through longitudinal axial movement effected by ledge 32 engaging beveled collar 18'. In FIG. 1, utilization of middle connector 4 is only possible if a user cuts the universal connector 10 at tapered end 48 of the middle connector. In that manner, the connector can be shortened from its original length, without having an unsightly loop of excess tubing when such extra length is not necessary to effect fluid communication between two locations. Fluid-tight engagement employing nut 38 is effected in a manner similar to that described previously.

Figure 17:
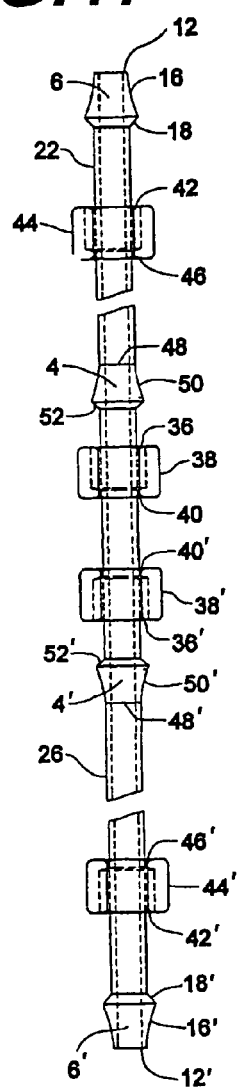
FIG. 17 is a side elevational view of a universal connector with two entrapped connector fittings illustrated in a manner similar to that for FIG. 1.
Figure 18:
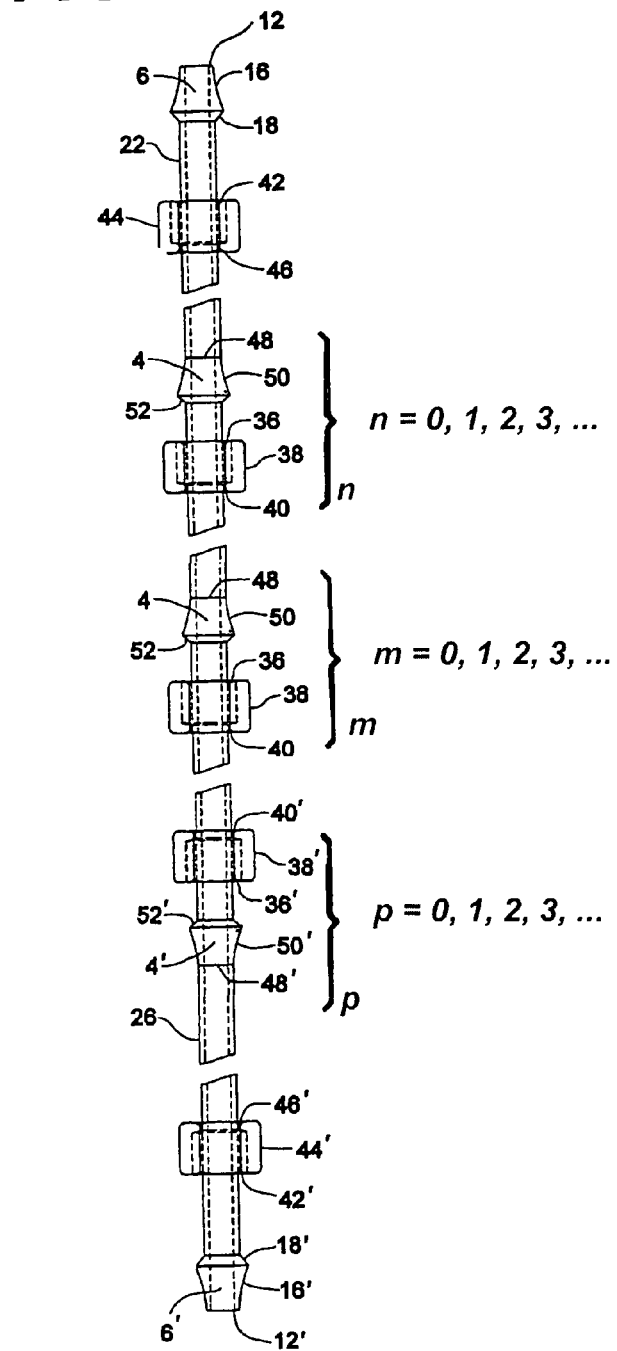
FIG. 18 is a side elevational view of a universal connector with three entrapped connector fittings illustrated in a manner similar to that for FIG. 1 illustrating various numbers of internal connectors and associated fittings.
Figure 19:
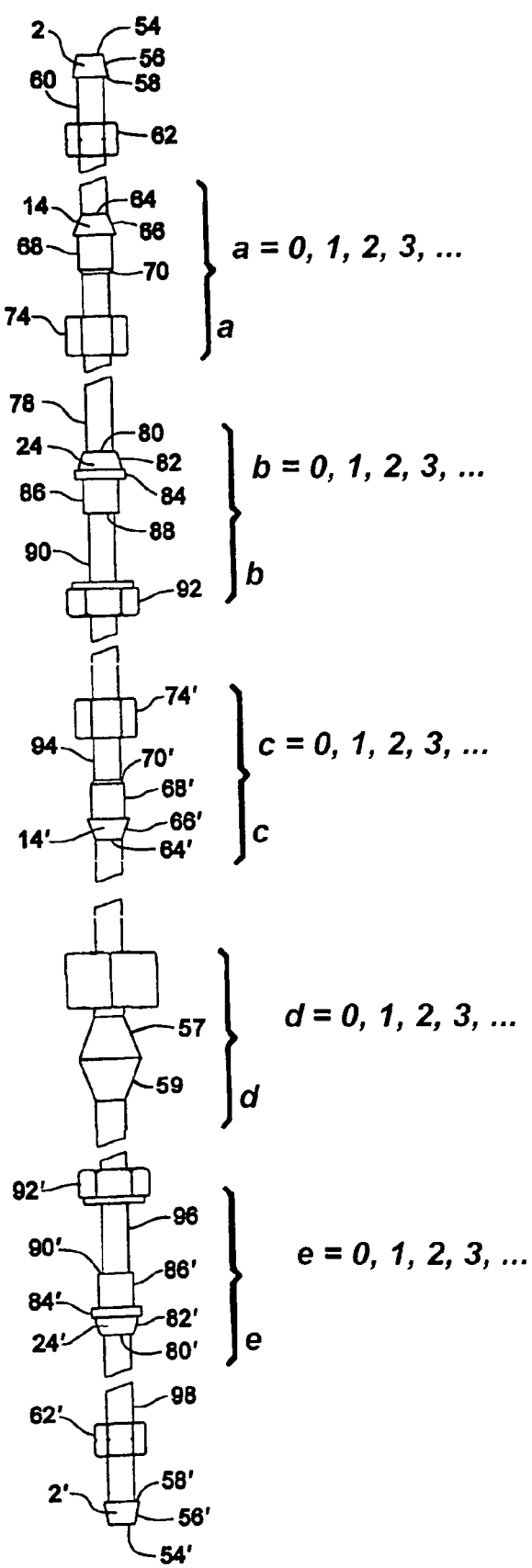
FIG. 19 is a side elevational view of a universal connector with multiple entrapped internal connectors and associated fittings.

While FIG. 1 illustrates an embodiment of the invention whereby three similarly geometried connectors are positioned on one length of tubing, there is no need to limit the invention to such, and in fact, larger numbers of entrapped connectors are envisioned within the scope of the invention, e.g., four (illustrated in FIG. 17) through n wherein n is an integral value which is appropriate for a predefined length of tubing, leaving a few inches between overmolded fittings (see FIGS. 18–19). It is generally preferred that for tubing lengths which are 8–10 feet in length, that n will generally be an integral value less than 10. It is generally considered that at least approximately 6 inches is necessary between connectors in order to effect the overmolding operation. The universal connector can also be smaller and larger, with ranges of 2–20 feet certainly within the scope of this invention. In fact, there is no theoretical upper limit to the length of the connector and therefore this dimension plays no role in this invention. Also, while FIG. 1 illustrates the use of three similarly geometrically shaped connectors, there is no need to limit the invention to such. FIG. 2 illustrates a universal connector 20 wherein the four entrapped connectors are of different shapes from that affixed to each end. It is obvious that there is no reason to limit the end connectors to the same geometry, and it is envisioned within the scope of this invention to have the same or different geometried connectors at either end.

As illustrated in FIG. 2, universal connector 20 is an elongated hollow extruded tube which has a first end 54 and an opposed and oppositely facing second end 54'. At each end is a first 2 and a second 2' oppositely facing connector, each connector having a terminal end 54,54', a linearly radially expanding sealing surface 56,56' and peripherally extending shelf or ledge 58,58'. At a location between first connector 2 and second connector 2', are a third overmolded connector 14, a fourth overmolded connector 24, a fifth connector 14', and a sixth connector 24'. The third 14 and fifth 14' connectors are shown having ends 64,64', a linearly radially expanding sealing surface 66,66' a cylindrical collar 68,68' and a beveled collar 70,70'. In expanded detail illustrated in FIG. 3, it is seen that overmolded connector 14 and by analogy, connector 14' may have an optional cylindrical shelf 72 upon which an inner ledge of nut 74 will engage. The fourth 24 and sixth 24' connectors are shown having ends 80, 80', a cup-shaped or cone-shaped sealing surface 82, 82', a radially expanding shelf 84, optionally having a lip 34 and upper ledge 76, better illustrated in FIG. 4, a cylindrical collar 86 with shelf 88.

Interposed between the first 2 and third 14 connector is a nut 62 having a centrally disposed aperture therein dimensioned for sliding movement about the exterior diameter of tube segment 60 and an outwardly facing hollowed out bore dimensioned for penetration and positioning in abutting contact with the upper ledge 58 of connector 2. Leak-proof engagement is effected through rotational threaded communication with a mating fitting (not shown), which effects peripheral axial longitudinal movement toward the fitting with sealing contact effected by sealing surface 56 on a circumference of an apertured opening in the fitting.

In a manner analogous to that described for nut 62, and interposed between the third 14 and fourth 24 connectors is nut 74 having a centrally disposed aperture therein dimensioned for sliding movement about the exterior diameter of tube segment 78 and an outwardly facing hollowed out bore dimensioned for penetration and positioning in abutting contact with cylindrical shelf 72 of connector 14 with leak-proof engagement effected in a similar manner. It is easily understood that sealing engagement with this third connector 14 can only be effected when universal connector 20 is cut at end 64, thereby exposing this connector for application into an appropriately diametered and geometried fitting.

As illustrated and interposed between the fourth 24 and fifth 14, connectors, are a pair of oppositely facing nuts 92 and 741 for engaging each respective connector by abutting contact with upper ledge 76 of radially expanding collar 84 of connector 24 and cylindrical shelf 72 of connector 14' respectively. Once again, it is easily understood that sealing engagement with fourth connector 24 can only be effected when universal connector 20 is cut at end 80, thereby exposing this connector for application into an appropriately diametered and geometried fitting or is cut at end 64', thereby exposing the appropriate connector. Similar considerations apply to sixth connector 24' as mentioned previously with the other internal connectors.

As illustrated in FIG. 2A, the invention encompasses the use of traditional ferrules 61 which slip over tube segment 60, in an alternative embodiment for either one or both end fittings. The ferrule has a linearly radially expanding sealing surface 57 and a linearly radially contracting rear sealing surface 59, which may optionally be configured as a shoulder (not shown) and a first end 54 which protrudes from the ferrule and is inserted into a mating female fitting (not shown).

It is within the scope of this invention to have the first and second connectors which are positioned at either end of the tube to be compression molded, injection molded or overmolded. FIG. 6 illustrates the use of an overmolded end connector 110 having a polymer nose cone 102 at one end which is secured to polymer tube 118 having two opposed ends 120,122 in a leak-proof manner, the second end connector not shown in the Figure. Tubing segment 104, the portion of tube 118 which is not attached to nose cone 102, can be of any desired length and this dimension plays no part in the invention. The nose cone 102 will have a front face 116, and a sealing surface 114, shown as cup-shaped or cone-shaped in the Figure, which terminates at radially expanding shelf 112. The inner surfaces of cylindrical collar 108 and beveled or radiused collar 106 are used to affix the nose cone in a leak-proof manner to the corresponding section of the outer surface of tubing segment 118. Nose cone 102 has an inner diameter $D_2$ which essentially matches the outer diameter of tube 118. The inner diameter $D_1$ of tube 118 will be smaller than that of $D_2$ by a thickness t of the tube.

The connector 110 will have its tubing segment 118 of a first rigidity and a first flexibility and a nose cone 102 of a second rigidity and a second flexibility. In one embodiment of the invention, the first rigidity will be harder than the second rigidity and the first flexibility will be less than the second flexibility, i.e., the nose cone will be "softer" and more "flexible" than the tube. In a second embodiment of this invention, the relationship will be the inverse of that described for the first embodiment, the first rigidity will be softer than the second rigidity and the first flexibility will be greater than the second flexibility, i.e., the nose cone will be "harder" and less "flexible" than the tube. This second embodiment configuration is preferred when higher pressures may be encountered in the application and when maximum flexibility of the connector is required. In yet a third embodiment of this invention, the rigidity of the nose cone and the tube will be essentially the same. In discussing the above terminology, it should be recognized that while there are no definite of the term definitions, which is important is the relative physical parameters with respect of one component to the other. In general, "soft" durometers are as low as 60 durometer Shore A and "rigid" durometers could be as high as 90 durometer Shore A. Phrased in a slightly different manner, rigid would be most similar to hard thermoset plastics whereas flexible would be most similar to rubbery thermoplastics.

Figure 7:
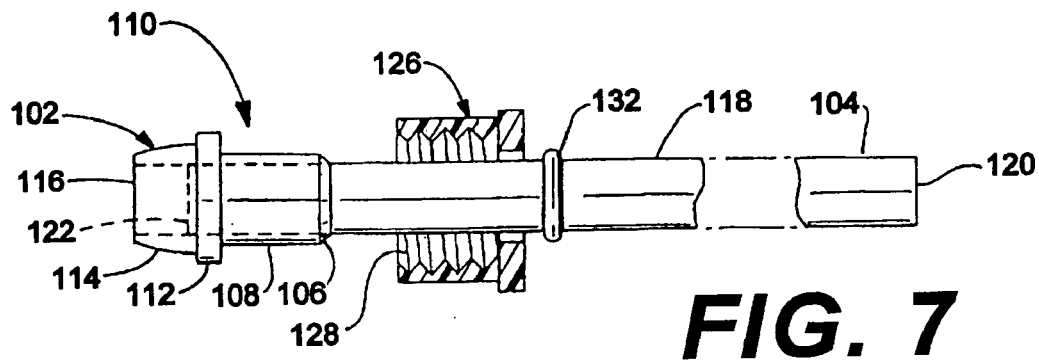
FIG. 7 is an enlarged side view of the plastic tube of FIG. 6 including a nut shown in cross-section positioned on the tube.

The leak-proof engagement of nose cone 102 with tube 118 as well as for any internally positioned connector, is effected by a process known to those skilled in the art as injection overmolding. In the embodiment of this invention, the application wherein a rigid tube and a flexible nose cone is described, one exemplary set of materials would include a low density polyethylene nose cone which is molded over a high density polyethylene tube prior to the step of crosslinking, the step of crosslinking being optional. In this manner, it is possible to obtain a material to material bond, thereby effecting the leak-proof attachment of the nose cone to the tube. The resulting connector, if crosslinked, is by means known in the art, e.g., silane crosslinking, radiation crosslinking, etc. In a variation of this process, it is possible to begin with material which is partially crosslinked before the overmolding process, followed by further crosslinking subsequent to the leak-proof attachment. The benefit of this embodiment is that the soft nose cone is a forgiving sealing surface. The application however, is generally limited to lower pressure applications in that due to the softness of the nose cone, it is possible under sufficient pressure, to have the shelf 112 and sealing surface 114 deform sufficiently to slip through nut 126, thereby prematurely disconnecting the tube from the orifice. As shown in FIG. 7, a nut 126, either of plastic or metal, having a plurality of threads 128 is shown which is used to effect sealing engagement with a mating orifice. In one embodiment of the invention, the connector may optionally have at least one ridge 132 molded into the connector to retain an appropriately sized nut in relatively close association to nose cone 102.

In another aspect of this invention, the connector will be a flexible tube and a harder, more rigid nose cone. In this embodiment, one exemplary set of materials would include a high density glass-filled polyethylene nose cone or other molded configuration, (e.g., threaded connector or nut) which is molded over a low density polyethylene tube prior to the step of crosslinking or after a limited degree of crosslinking has occurred. In this manner, it is possible to obtain a material-to-material bond, thereby effecting the leak-proof attachment of the nose cone to the tube. The resulting connector is crosslinked by means known in the art. In a variation of this process, it is possible to begin with material which is partially crosslinked before the overmolding process, followed by further crosslinking subsequent to the leakproof attachment. The benefit of this embodiment is that the hard nose cone is suitable for higher pressure applications than possible in the first embodiment. Due to the more rigid nature of the nose cone, it is not possible for shelf 112 and sealing surface 114 to deform sufficiently to slip through nut 126, thereby prematurely disconnecting the tube from the orifice. In addition, due to the flexible nature of the tube, it is possible to twist the tube to conform to an irregular pathway, without having the tube inner diameter $D_1$ decreased due to kinking of the tube. In yet another embodiment of this invention, the connectors and the tubes will be of the same material.

One polymer useful in this invention is polyethylene. The main features which influence the properties of polyethylene are (1) the degree of branching in the polymer; (2) the average molecular weight; and (3) the molecular weight distribution. Polyethylene is partially amorphous and partially crystalline. The percent crystallinity has a marked effect on physical properties. Side chain branching is the key factor controlling the degree of crystallinity. High density polyethylene (HDPE) has fewer side-chain branches than low density polyethylene (LDPE), therefore, a more tightly packed structure and a higher degree of crystallinity can be obtained. HDPE is characterized as being a highly crystalline material, perhaps as much as 85% while LDPE exhibits crystallinities as low as 50%. The amount of branching is controlled in the LDPE and HDPE processes in order to adjust crystallinity and physical properties.

The density of polyethylene affects many physical properties. In general, increasing density increases stiffness, tensile strength, hardness, heat and chemical resistance, opacity and barrier properties, but reduces impact strength and stress-crack resistance. As used in this application, low density polyethylene will mean an ethylene polymer which has a specific gravity of about 0.89 to 0.915, a tensile strength of about 1,500 psi; an impact strength over 10 ft-lb/in./notch; a thermal expansion of $17 \times 10^{-5}$ in/in/° C. When discussing high density polyethylene, an ethylene polymer which has a specific gravity of about 0.94 to 0.95, a tensile strength of about 4,000 psi; impact strength of 8-ft-lb/in/notch. It is of course recognized, that it is possible to use materials which are a blend of various polyethylenes or other compatible materials in many different ratios. When discussing crosslinked polyethylene, an ethylene polymer, either low or high density, will be intended wherein the polymer has been either exposed to radiation with electron beam or gamma rays, crosslinking taking place through a primary valence bond, or by chemical crosslinking means, such as by using an organic peroxide, or by using silane. The range of crosslinking can be as low as from 30% to 90% or higher.

Crosslinking can of course, be accomplished in many different ways. Crosslinking can be performed during the extrusion process, e.g., by the Engel process, or post-extrusion, e.g., by a silane process or a peroxide process or combinations thereof wherein some crosslinking occurs during the extrusion step and is completed in a hot bath post-extrusion step. Each process has a crosslinking catalyst that causes the polymer to crosslink when certain temperature and pressure and/or humidity are used. One additional way to crosslink is to use radiation. In this method, extruded tubes are passed under a radiation unit and the exposure causes crosslinking. It usually is more economical to irradiate straight tubes since the economics revolve around how many parts will fit on a cart that rolls under the beam. However, this does not represent the only embodiment contemplated within the invention. It is envisioned that under some circumstances, it would be appropriate to crosslink the final product.

Figure 8:
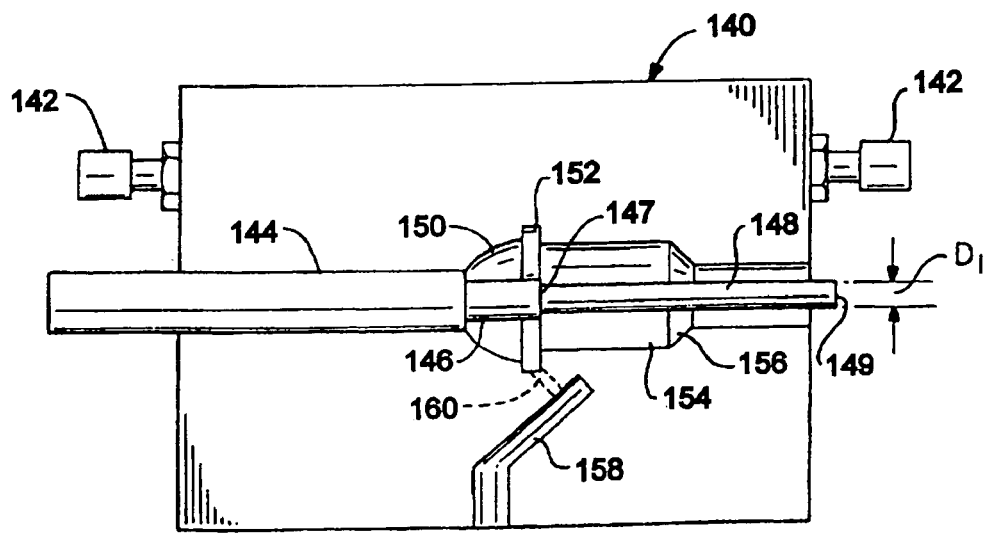
FIG. 8 is a top view of one half of a mold used in the process of overmolding a nose cone onto a plastic tube.

FIG. 8 shows one half of a mold 140 which would be effective in the overmolding process to position connectors to the peripheral ends of the universal connector. The mold comprises a mandrel 144 having extending portions 146, 148 and terminating at a point outside the mold 140. It is not necessary that the mandrel extending portion have two different diameters as shown in FIG. 8, although this is preferred. At least a portion of the extending mandrel will have an outer diameter which essentially matches the inner diameter of the plastic tube, to permit the insertion of the tube onto the extending portion of the mandrel. The mold may have various geometries depending on the desired shape of the connector. In FIG. 8, the mold shows a radiused or conical base 150 which will form the sealing surface of the nose cone terminating in a mold shelf recess 152. Cylindrical mold portion 154 extends from this shelf recess and terminates in radiused or beveled mold portion 156. Overmolding feed conduit 158 is used to transfer flowable polymer from a source (not shown) into mold 140 via transfer conduit 160 shown in the Figure to be at the location of mold shelf recess 152, although there is no reason to limit the location to this point, other entry points being satisfactory depending upon design criterion and location of the parison. Connectors 142 are used for heating and optionally cooling of the mold.

FIG. 9 shows the positioning of the plastic tube 118 onto the extending portion 148 of the mandrel 144 terminating at the terminal shelf 147 of the first larger extending portion 146 of the mandrel 144 while FIG. 10 shows the product after the overmolding process has been completed. It should be recognized that the precise location of the first terminal shelf 147 of the first extending portion 146 of the mandrel 144 need not coincide with the location of nose cone shelf 112, although it often will be in the vicinity thereof. In some instances, the extending mandrel portion will only be the second smaller diametered section, and the first extending portion will be eliminated completely.

In operation, the mold cycle times and temperatures used will be dependent upon the composition of the materials used and the geometry of the part(s) being molded as well as the degree of dimensional control required for the molded product. It is possible to have a cycle time range from five seconds to several minutes depending on the curing time for the molded material. In general for crosslinked polyethylene tubing, the temperatures used will range from 350° F. melt up to 540° F. although similar operations variables which were discussed for the mold cycle time are equally applicable here. Molding pressure will also be subject to similar considerations, and for crosslinked polyethylene, can range from 200 psi to 2,000 psi (hydraulic). In general, the colder the melt, the higher the pressure which is required to fill and pack the mold. If the part which is to be molded has a very thick section, then it may be desirable to use a low melt temperature, high melt pressure and as low a cycle time as possible. Given the interactivity between the above variables in an injection molding process, the range of the processing variables is almost limitless within broad guidelines and within the skill of those in the art.

It is easily recognized by those skilled in the art that it is possible to have overmolded connectors positioned at locations other than the peripheral extremities of the tube. When other connectors are being overmolded, it is recognized that mold 140 would be adapted as illustrated in FIG. 14 which shows one half of a mold 140 which would be effective in the overmolding process to position connectors to locations internal to the peripheral ends of the universal connector. The mold comprises an insertable mandrel 144 terminating at a point 149 outside the mold 140 and which is insertable into mold recesses 172,174. At least a portion of the extending mandrel will have an outer diameter which essentially matches the inner diameter of the plastic tube, to permit the insertion of the tube onto the extending portion of the mandrel. The mold may have various geometries depending on the desired shape of the connector. In FIG. 14, the mold shows a radiused or conical base 150 which will form the sealing surface of the nose cone terminating in a mold shelf recess 152. Cylindrical mold portion 154 extends from this shelf recess and terminates in radiused or beveled mold portion 156. Overmolding feed conduit 158 is used to transfer flowable polymer from a source (not shown) into mold 140 via transfer conduit 160 shown in the Figure to be at the location of mold shelf recess 152, although there is no reason to limit the location to this point, other entry points being satisfactory depending upon design criterion and location of the parison. Connectors 142 are used for heating and optionally cooling of the mold. The mold recesses 172,174 are dimensioned to snugly fit about an external diameter of the tube while mandrill 148 is dimensioned to snugly fit about an internal diameter of the tube. It is recognized that depending on the structural integrity of the tube at overmolding temperatures, it is possible that a mandrill is not necessary at all.

Figure 21:
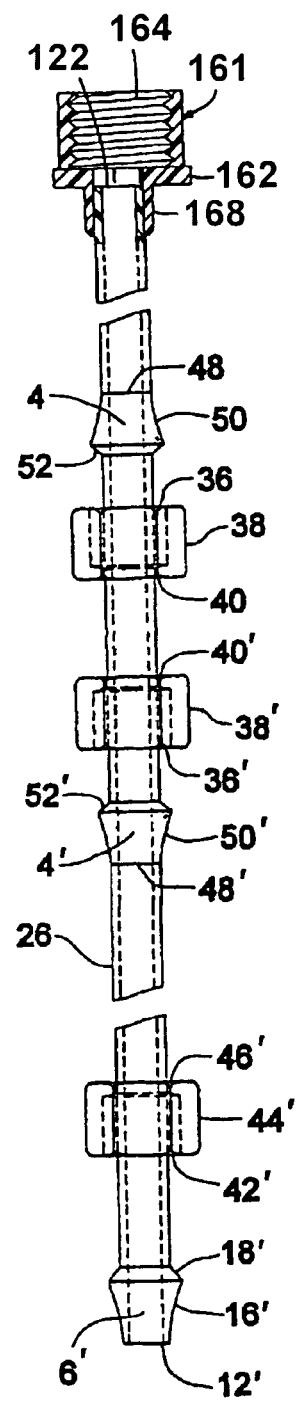
FIG. 21 is a side elevational view similar to FIG. 20 illustrating an internally threaded injection overmolded connector for one end fitting.

While the above discussion has focused attention on the overmolding of a nose cone, there is no need to limit the invention to such. In fact, as shown in FIG. 11, an overmolded nut is shown, said nut having been formed by analogous processing to that described previously for nose cones. Therefore, it is within the scope of this invention to have a nut on one end of the universal connector (FIG. 21) and a connection at an opposed end with other connectors positioned between the two extremities. The overmolded nut 161 is shown affixed to tube 118, the nut containing a threaded bore 164 and a shoulder 162. The inner surfaces of the barrel portion 168 and radiused taper 166 are used to affix the nut in a leak-proof manner to the corresponding section of the outer surface of tubing element 118. This nut in one embodiment will be glass-filled polyethylene and will optionally incorporate an "O" ring to seal. In this configuration, it is obviously recognized that the tube would turn while screwing the connector into place.

Figure 20:
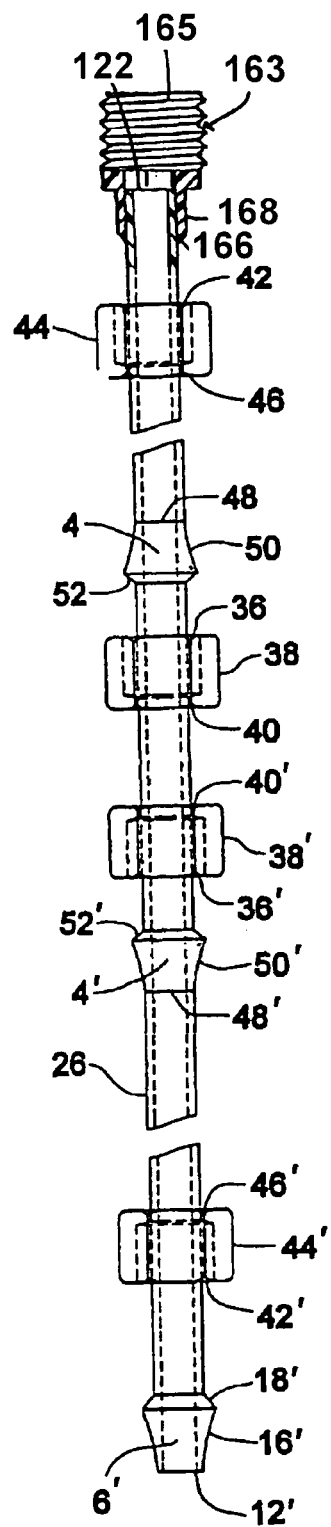
FIG. 20 is a side elevational view similar to FIG. 1 illustrating an externally threaded injection overmolded connector for one end fitting.

Yet another variation, an overmolded threaded connector, is shown in FIG. 13, which is similar to that shown and described previously with reference to FIG. 11, where an overmolded nut was shown. The threaded connector is formed by analogous processing to that described previously for nose cones, the mold design being different. The overmolded threaded connector 163 is shown affixed to tube 118, the connector being threaded 165 and having a shoulder 162 (FIG. 20). The inner surfaces of the barrel portion 168 and radiused taper 166 are used to affix the nut in a leak-proof manner to the corresponding section of the outer surface of tubing element 118. This threaded connector in one embodiment will be glass-filled polyethylene.

In FIG. 12, yet another embodiment of this invention is shown wherein an overbraid 170 has been applied to the tube prior to the overmolding process. The overbraiding could be fiberglass, nylon webbing, stainless steel, etc.

When either or both of the end connectors are formed by compression molding, then it is recognized that at least a portion of an end of an extruded tube is heated using any number of heating sources, e.g., heating blocks, sonics or a heating jacket employing oil or other heating medium. This heating is for a predetermined length of time so that the heated end is melt processible, but short of a complete melt. Those skilled in the art are familiar with the temperatures described in this operation and each polymer has its own range of appropriate temperatures. For illustrative purposes only, this temperature would be approximately between 600°–900° F., and more specifically, approximately 700° F.±25° F. for between 10–30 second for polypropylene. The key is to balance temperature and dwell time within the heating blocks. It is well within the skill of those in the art to vary the time and/or temperatures noted to achieve the desired degree of softness necessary for further processing.

After the desired amount of heat is applied, the heating blocks are removed. Depending upon the polymer and/or time and/or temperatures used, a cooling cycle may be employed before the initiation of the next step. The heated tube is inserted into a die having a mandrill centrally disposed therein and appropriately configured so as to mold a desired connection geometry by applying longitudinal axial compression forces to the tube, thereby forcing the heated end of the tube to melt flow into the cavities of the die. After the molding operation is concluded, the split die is optionally cooled, followed by subsequent opening of the die and removal of the newly molded connector. It is of course, envisioned that the heating blocks mentioned previously could be eliminated if all heating is to occur within the die.

FIG. 15 illustrates yet another embodiment of the invention wherein one fitting 180 may have a removable nosecone 176. In this embodiment, plastic tube 118 of diameter $d_1$ has a shelf 112 which positions removable nosecone 176 with an optional fillet 178. Open face 176 of nut 126 is positionable about an external diameter of fillet 178 by sliding engagement over the shelf by internally threaded circular bore 128 of nut 126. Fastening engagement would snug nut 126 into a mating receptacle by longitudinal axial compressive movement effected by turning the plurality of parallel-spaced ridges 162 about the axis of the tube 118 forcing the internal diameter 182 to fit in proximity with the external diameter of fillet 178. As illustrated in FIG. 16, nosecone 176 may be configured to look more like a flattened washer 178.

While only a few polymers have been mentioned, the present invention is applicable to a wide variety of polymers including polyolefins, polycarbonates, polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Additionally included would be mixtures of different polymers, such as polyphenylene ether/styrenic resin blends, polyvinylchloride/ABS or other impact modified polymers, such as methacrylonitrile containing ABS, and polyester/ABS or polyester plus some other impact modifier may also be used. Such polymers are available commercially or may be made by means well known in the art.

More specifically, polymers of monoolefins and diolefins, for example would include polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example mixtures of polypropylene with polyisobutylene, polypropylene with polyethylene (for example PP/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/butadiene, isobutylene/isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene-propylene copolymers, LDPE/EVA, LDPE/EAA, LLDPE/EVA and LLDPE/EAA.

Thermoplastic polymers may also include styrenic polymers, such as polystyrene, poly-(p-methylstyrene), poly-(.alpha.-methylstyrene), copolymers of styrene or .alpha.-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or .alpha.-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolylmers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, acrylonitrile/butadiene/styrene (ABS), and ABS which includes methacrylonitrile.

Polymers based on acrylic acids, include acrylic acid, methacrylic acid, methyl methacrylate acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homopolymers and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride tercopolymer, vinyl chloride-styrene-acrylonitrile copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyxymethylene with contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acid and diols and/or from hydroxycarboxylic acids or the corresponding lactones, such as polyethylene terephthalate, polybutylene terephthalate, poly-1,4-dimethyliol-cyclohexane terephthalate, poly[2,2,4-(4-hydroxyphenyl)-propane] terephthalate and polyhydroxybenzoates as well as block copolyetheresters derived from polyethers having hydroxyl end groups.

Polyamides and copolyamides which are derived from diamines and dicarboxylic acids and/or from aminocarboxylic acids or the corresponding lactams, such as polyamide-4, polyamide-6, polyamide-6/6, polyamide-6/10, polyamide-6/9, polyamide-6/12, polyamide-4/6, polyamide-11, polyamide-12, aromatic polyamides obtained by condensation of m-xylene, diamine and adipic acid; polyamides prepared from hexamethylene diamine and isophthalic and/or terephthalic acid and optionally an elastomer as modifier, for example, poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols, and polyamides or copolyamides modified with EPDM or ABS may be used.

It is recognized that not all combinations of polymers mentioned are compatible and therefore, would not be suitable for use in the injection overmolding operation. It is well within the scope of those skilled in the art to know which combinations are acceptable, or easily determinable. It is additionally possible that even incompatible polymer combinations may be made compatible by surface treatment of the tube connector polymer, e.g., corona or chemical treatment.

This invention has been described in detail with reference to specific embodiments thereof, including the respective best modes for carrying out each embodiment. It shall be understood that these illustrations are by way of example and not by way of limitation.

What is claimed is:
1. A connector which comprises:
   (a) a polymeric tube having two ends and an essentially centrally disposed hole therethrough;
   (b) a pair of oppositely facing connectors at each end of said tube,
      (i) each connector having an end, a sealing surface adjacent said end, and a shoulder adjacent said sealing surface, and
      (ii) an internally threaded outwardly-facing nut, said nut having an essentially centrally disposed aperture, a diameter of said aperture dimensioned for sliding movement about said tube yet smaller than a diameter of said shoulder of said connector, said nut having an internal bore dimensioned to permit movement over said shoulder of said connector, said nut positioned internal of said shoulder of each connector; and
   (c) at least one third connector on said tube internal of said two oppositely facing connectors at each end of said tube and said outwardly-facing nuts, said at least one third connector further comprising

(i) a third connector end, a third sealing surface adjacent said third end, and a third shoulder adjacent said third sealing surface, and (ii) a third internally threaded nut for said third connector, said third nut facing toward said third sealing surface, said third nut having an essentially centrally disposed third aperture, a diameter of said third aperture dimensioned for sliding movement about said tube yet smaller than a diameter of said third shoulder, said third nut having a third internal bore dimensioned to permit movement over said third shoulder, said third nut positioned adjacent to said third shoulder.

2. The connector of claim 1 wherein
(a) said two oppositely facing connectors and said at least one third connector have essentially identical sealing surfaces.

3. The connector of claim 1 wherein
(a) at least one sealing surface of said two oppositely facing connectors and said at least one third connector is a different geometry.

4. The connector of claim 1 wherein
(a) said connector has at least three different sealing surfaces.

5. The connector of claim 1 wherein
(a) said tube and said connectors are selected from the group consisting of polyolefins, polycarbonates, polyesters, polyesters, polyurethanes, polyalkylene terephthalates, polysulfones, polyimides, polyphenylene ethers, styrenic polymers, polycarbonates, acrylic polymers, polyamides, polyacetals, halide containing polymers, copolymers thereof and blends thereof.

6. The connector of claim 5 wherein
(a) said tube is braided.

7. The connector of claim 1 wherein
(a) said at least one third connector is at least two oppositely facing connectors internal of said two connectors at each end of said tube and said outwardly facing nuts, each of said at least two oppositely facing connectors further comprising:
   (i) an outwardly-facing end, an outwardly-facing sealing surface adjacent said ends, and a shoulder adjacent said outwardly-facing sealing surface, and
   (ii) an outwardly-facing internally threaded nut, said nut having an essentially centrally disposed aperture, a diameter of said aperture dimensioned for sliding movement about said tube yet smaller than a diameter of said shoulder, said nut having an internal bore dimensioned to permit movement over said shoulder, said nut positioned adjacent to said shoulder.

8. The connector of claim 7 wherein
(a) said two oppositely facing connectors and said at least two oppositely facing internal connectors have essentially identical sealing surfaces.

9. The connector of claim 7 wherein
(a) at least one sealing surface of said two oppositely facing connectors and said at least two oppositely facing internal connectors is a different geometry.

10. The connector of claim 7 wherein
(a) said connector has at least three different sealing surfaces.

11. The connector of claim 7 wherein
(a) said tube and said connectors are selected from the group consisting of polyolefins, polycarbonates, polyesters, polyesters, polyurethanes, polyalkylene terephthalates, polysulfones, polyimides, polyphenylene ethers, styrenic polymers, polycarbonates, acrylic polymers, polyamides, polyacetals, halide containing polymers, copolymers thereof and blends thereof.

12. The connector of claim 11 wherein
(a) said tube is braided.

13. The connector of claim 1 wherein
(a) said at least one third connector is at least is at least three connectors internal of said two connectors at each end of said tube and said outwardly facing nuts, each of said at least three connectors further comprising:
   (i) an outwardly-facing end, an outwardly-facing sealing surface adjacent said ends, and a shoulder adjacent said outwardly-facing sealing surface, and
   (ii) an outwardly-facing internally threaded nut, said nut having an essentially centrally disposed aperture, a diameter of said aperture dimensioned for sliding movement about said tube yet smaller than a diameter of said shoulder, said nut having an internal bore dimensioned to permit movement over said shoulder, said nut positioned adjacent to said shoulder.

14. The connector of claim 13 wherein
(a) said two oppositely facing connectors and said at least three internal connectors have essentially identical sealing surfaces.

15. The connector of claim 13 wherein
(a) at least one sealing surface of said two oppositely facing connectors and said at least three internal connectors is a different geometry.

16. The connector of claim 13 wherein
(a) said connector has at least three different sealing surfaces.

17. The connector of claim 13 wherein
(a) said tube and said connectors are selected from the group consisting of polyolefins, polycarbonates, polyesters, polyesters, polyurethanes, polyalkylene terephthalates, polysulfones, polyimides, polyphenylene ethers, styrenic polymers, polycarbonates, acrylic polymers, polyamides, polyacetals, halide containing polymers, copolymers thereof and blends thereof.

18. The connector of claim 17 wherein
(a) said tube is braided.

19. The connector of claim 1 wherein
(a) said at least one third connector is at least is at least four connectors internal of said two connectors at each end of said tube and said outwardly facing nuts, each of said at least four connectors further comprising:
   (i) an outwardly-facing end, an outwardly-facing sealing surface adjacent said ends, and a shoulder adjacent said outwardly-facing sealing surface, and
   (ii) an outwardly-facing internally threaded nut, said nut having an essentially centrally disposed aperture, a diameter of said aperture dimensioned for sliding movement about said tube yet smaller than a diameter of said shoulder, said nut having an internal bore dimensioned to permit movement over said shoulder, said nut positioned adjacent to said shoulder.

20. The connector of claim 19 wherein
(a) said two oppositely facing connectors and said at least four internal connectors have essentially identical sealing surfaces.

21. The connector of claim 19 wherein
(a) at least one sealing surface of said two oppositely facing connectors and said at least four internal connectors is a different geometry.

22. The connector of claim 19 wherein
(a) said connector has at least three different sealing surfaces.

23. The connector of claim 19 wherein
(a) said tube and said connectors are selected from the group consisting of polyolefins, polycarbonates, polyesters, polyesters, polyurethanes, polyalkylene terephthalates, polysulfones, polyimides, polyphenylene ethers, styrenic polymers, polycarbonates, acrylic polymers, polyamides, polyacetals, halide containing polymers, copolymers thereof and blends thereof.

24. The connector of claim 23 wherein
(a) said tube is braided.

25. The connector of claim 1 wherein
(a) said at least one third connector is at least is at least five connectors internal of said two connectors at each end of said tube and said outwardly facing nuts, each of said at least five connectors further comprising:
   (i) an outwardly-facing end, an outwardly-facing sealing surface adjacent said ends, and a shoulder adjacent said outwardly-facing sealing surface, and
   (ii) an outwardly-facing internally threaded nut, said nut having an essentially centrally disposed aperture, a diameter of said aperture dimensioned for sliding movement about said tube yet smaller than a diameter of said shoulder, said nut having an internal bore dimensioned to permit movement over said shoulder, said nut positioned adjacent to said shoulder.

26. The connector of claim 25 wherein
(a) said two oppositely facing connectors and said at least five internal connectors have essentially identical sealing surfaces.

27. The connector of claim 25 wherein
(a) at least one sealing surface of said two oppositely facing connectors and said at least five internal connectors is a different geometry.

28. The connector of claim 25 wherein
(a) said connector has at least three different sealing surfaces.

29. The connector of claim 25 wherein
(a) said tube and said connectors are selected from the group consisting of polyolefins, polycarbonates, polyesters, polyesters, polyurethanes, polyalkylene terephthalates, polysulfones, polyimides, polyphenylene ethers, styrenic polymers, polycarbonates, acrylic polymers, polyamides, polyacetals, halide containing polymers, copolymers thereof and blends thereof.

30. The connector of claim 29 wherein
(a) said tube is braided.

31. The connector of claim 1 wherein
(a) said at least one third connector is at least is at least six connectors internal of said two connectors at each end of said tube and said outwardly facing nuts, each of said at least six connectors further comprising:
   (i) an outwardly-facing end, an outwardly-facing sealing surface adjacent said ends, and a shoulder adjacent said outwardly-facing sealing surface, and
   (ii) an outwardly-facing internally threaded nut, said nut having an essentially centrally disposed aperture, a diameter of said aperture dimensioned for sliding movement about said tube yet smaller than a diameter of said shoulder, said nut having an internal bore dimensioned to permit movement over said shoulder, said nut positioned adjacent to said shoulder.

32. The connector of claim 31 wherein
(a) said two oppositely facing connectors and said at least six internal connectors have essentially identical sealing surfaces.

33. The connector of claim 31 wherein
(a) at least one sealing surface of said two oppositely facing connectors and said at least six internal connectors is a different geometry.

34. The connector of claim 31 wherein
(a) said connector has at least three different sealing surfaces.

35. The connector of claim 31 wherein
(a) said tube and said connectors are selected from the group consisting of polyolefins, polycarbonates, polyesters, polyesters, polyurethanes, polyalkylene terephthalates, polysulfones, polyimides, polyphenylene ethers, styrenic polymers, polycarbonates, acrylic polymers, polyamides, polyacetals, halide containing polymers, copolymers thereof and blends thereof.

36. The connector of claim 35 wherein
(a) said tube is braided.

37. A connector which comprises:
(a) a hollow polymeric tube having two ends and a longitudinal axis;
(b) a pair of oppositely facing connector means at each end of said tube, both of said pair of oppositely facing connector means comprising an end, a sealing surface adjacent said end, and a shoulder adjacent said sealing surface; and
(c) at least one third connector means on said tube internal of said pair of oppositely facing connector means at each end of said tube and coaxial with said longitudinal axis, said at least one third connector means having an associated fastening means coaxially interposed between said at least one third connector means and at least one of said oppositely facing connector means at each end of said tube, said at least one third connector means comprising an end, a sealing surface adjacent said end, and a shoulder adjacent said sealing surface.

38. The connector of claim 37 wherein
(a) both of said pair of oppositely facing connector means and at least two of said at least one third connector means further comprises
   (i) an end, a sealing surface adjacent said end, and a shoulder adjacent said sealing surface.

39. The connector of claim 38 wherein
(a) both of said pair of oppositely facing connector means and at least three of said at least one third connector means further comprises
   (i) an end, a sealing surface adjacent said end, and a shoulder adjacent said sealing surface.

40. The connector of claim 39 wherein
(a) both of said pair of oppositely facing connector means and at least four of said at least one third connector means further comprises
   (i) an end, a sealing surface adjacent said end, and a shoulder adjacent said sealing surface.

41. The connector of claim 40 wherein
(a) at least two of said sealing surfaces is of a different geometry from said other sealing surfaces.

42. The connector of claim 41 wherein
(a) said different sealing surfaces are said sealing surfaces of said at least four of said at least one third connector means.

43. The connector of claim 41 wherein
(a) at least three of said sealing surfaces is of a different geometry from said other sealing surfaces.

44. The connector of claim 43 wherein
(a) said different sealing surfaces are said surfaces of said at least two of said at least one third connector means.

45. The connector of claim 39 wherein
(a) at least two of said sealing surfaces is of a different geometry from said other sealing surfaces.

46. The connector of claim 45 wherein
(a) said different sealing surfaces are said sealing surfaces of said at least three of said at least one third connector means.

47. The connector of claim 45 wherein
(a) at least three of said sealing surfaces is of a different geometry from said other sealing surfaces.

48. The connector of claim 47 wherein
(a) said different sealing surfaces are said surfaces of said at least two of said at least one third connector means.

49. The connector of claim 38 wherein
(a) at least two of said sealing surfaces is of a different geometry from said other sealing surfaces.

50. The connector of claim 49 wherein
(a) said different sealing surfaces are said sealing surfaces of said at least two of said at least one third connector means.

51. The connector of claim 49 wherein
(a) at least three of said sealing surfaces is of a different geometry from said other sealing surfaces.

52. The connector of claim 51 wherein
(a) said different sealing surfaces are said surfaces of said at least two of said at least one third connector means.

53. The connector of claim 37 wherein
(a) at least one of said sealing surfaces is of a different geometry from said other sealing surfaces.

54. The connector of claim 53 wherein
(a) said different sealing surface is said sealing surface of said at least one third connector means.

55. The connector of claim 37 wherein
(a) at least one of said pair of oppositely facing connector means at each end of said tube further comprises
   (i) an internally threaded connector means.

56. The connector of claim 37 wherein
(a) at least one of said pair of oppositely facing connector means at each end of said tube further comprises
   (i) an externally threaded connector means.

\* \* \* \* \*

UNITED STATES PATENT AND TRADEMARK OFFICE
CERTIFICATE OF CORRECTION

PATENT NO. : 6,902,210 B1
DATED : January 20, 2006
INVENTOR(S) : Rowley, William It is certified that error appears in the above-identified patent and that said Letters Patent is hereby corrected as shown below:

Column 5,
Line 5, delete "14" and substitute -- 14' --.
Line 6, delete "741" and substitute -- 74' --.

Signed and Sealed this

Twenty-first Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,902,210 B1  
DATED : June 7, 2005  
INVENTOR(S) : Rowley, William Page 1 of 1

It is certified that error appears in the above-identified patent and that said Letters Patent is hereby corrected as shown below:

<u>Column 5,</u>
Line 5, delete "14" and substitute -- 14′ --.
Line 6, delete "741" and substitute -- 74′ --.

This certificate supersedes Certificate of Correction issued March 21, 2006.

Signed and Sealed this

Second Day of May, 2006

JON W. DUDAS
*Director of the United States Patent and Trademark Office*